July 16, 1968 J. P. FRANCIS 3,392,682
VEHICLE FOR TRANSPORTING FREIGHT
Filed May 17, 1966 2 Sheets-Sheet 1
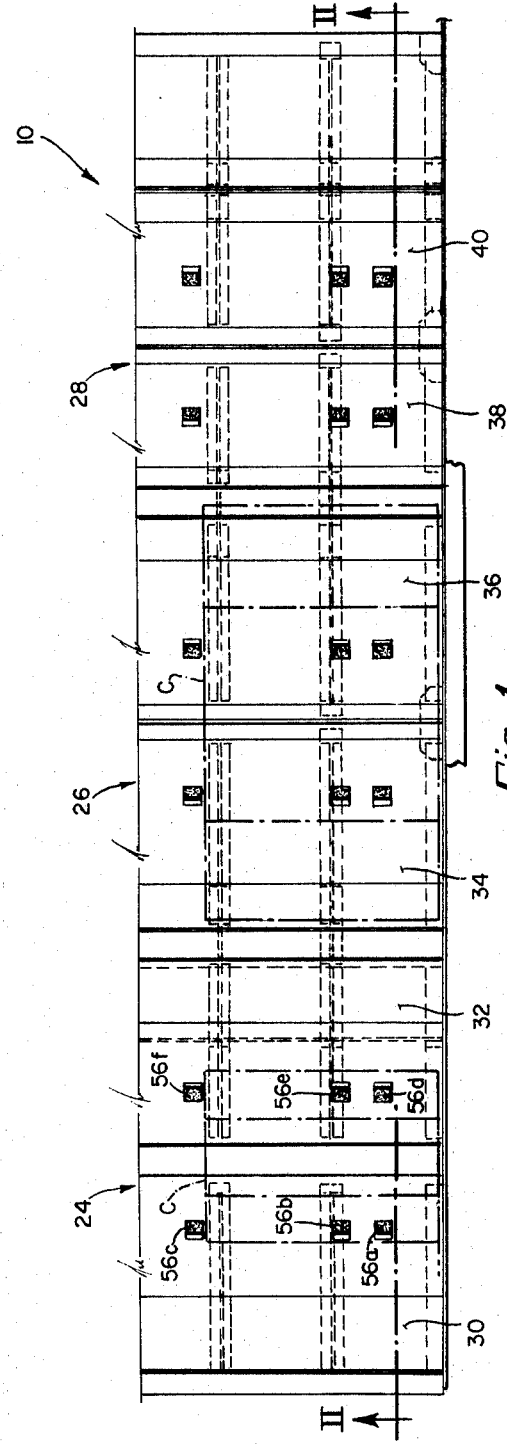
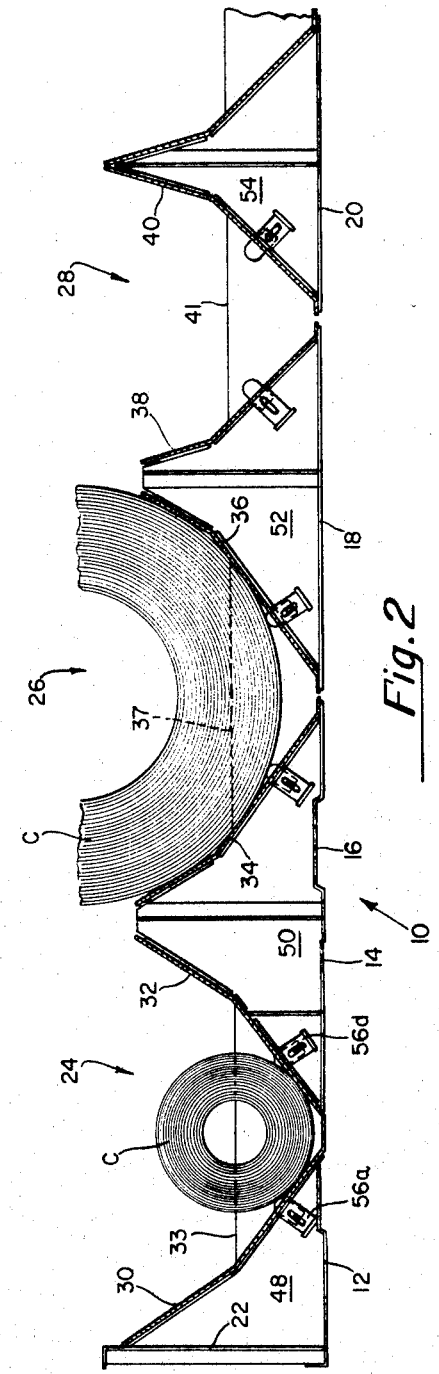
INVENTOR.
JOHN P. FRANCIS
BY
Paul + Paul
ATTORNEYS.

July 16, 1968  J. P. FRANCIS  3,392,682
VEHICLE FOR TRANSPORTING FREIGHT
Filed May 17, 1966  2 Sheets-Sheet 2

INVENTOR.
JOHN P. FRANCIS
BY
Paul + Paul
ATTORNEYS.

united States Patent Office 3,392,682
Patented July 16, 1968

3,392,682
VEHICLE FOR TRANSPORTING FREIGHT
John P. Francis, 2605 Summit St.,
Bethel Park, Pa. 15102
Filed May 17, 1966, Ser. No. 550,712
2 Claims. (Cl. 105—367)

ABSTRACT OF THE DISCLOSURE

A freight vehicle having a floor provided with transverse troughs for cradling cylindrical objects and the like, and resilient members associated with the troughs for engaging the objects to prevent them from shifting.

This invention relates generally to vehicles for transporting freight and particularly to devices for securing the freight against excessive movement transversely of the vehicle due to vibration induced by vehicle motion.

A principal object of the invention is to provide an improved vehicle for the shipment of coils of metal or the like weighing many tons.

Another object is to eliminate the extensive blocking that is now necessary for holding to permissible limits lateral movement of the coils due to vibration induced by vehicle motion.

Another object is to provide spring loaded, depressible, load restraining devices for positively holding to permissible limits lateral movement of coils cradled in troughs extending transversely of the vehicle.

Another object is to provide means for restraining the coils, which means eliminates any necessity for a worker to be in the vehicle while the coils are being loaded or unloaded.

Other objects of the invention will become apparent when the following description is read with reference to the accompanying drawings, in which:

FIGURE 1 is a one-quarter plan view of the floor of a railroad freight car constructed in accordance with the invention;

FIGURE 2 is a section on line II—II in FIGURE 1;

Figure 3:
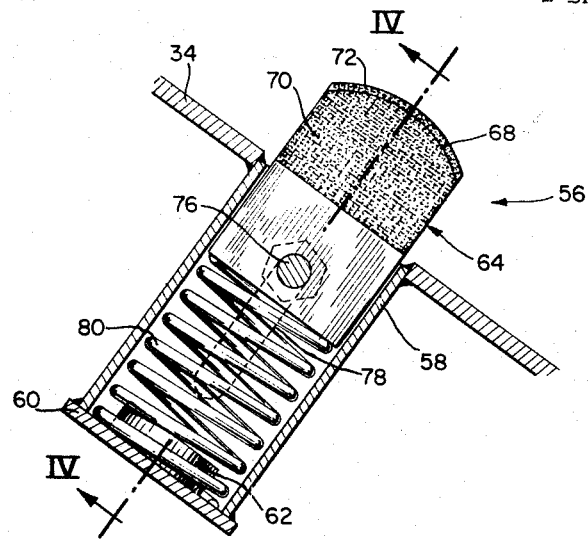
FIGURE 3 is a longitudinal section through the spring loaded, depressible, load restraining device.
Figure 4:
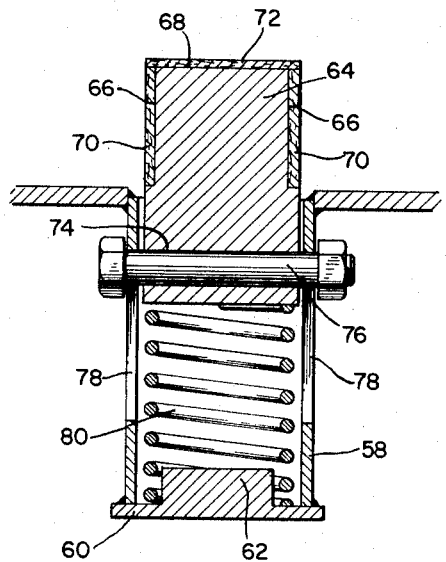
FIGURE 4 is a section on line IV—IV in FIGURE 3.

The following description is directed to the specific embodiment of the invention shown in the drawings. It is not addressed to the scope of the invention, which may be practiced in a variety of forms.

The railroad car constructed in accordance with the invention comprises a floor structure, generally designated 10, including horizontally extending floor plates 12, 14, 16, 18 and 20 and an upright end plate 22. Overlying the floor plates are a series of troughs 24, 26 and 28 extending across the car. The trough 24 comprises a pair of trough plates 30 and 32 and an end plate 33 at each end thereof. The trough 26 comprises a pair of trough plates 34 and 36 and an end plate 37 at each end thereof. The trough 28 comprises a pair of end plates 38 and 40 and an end plate 41 at each end thereof. Underlying the trough plate 30 are laterally spaced upright support plates 48, and underlying the trough plates 32 and 34 are laterally spaced upright support plates 50. Underlying the trough plates 36 and 38 are laterally spaced upright support plates 52, and underlying the trough plate 40 are laterally spaced upright support plates 54. The several plates aforesaid, of course, are secured together, as by welding, to afford a rigid well known floor structure.

Each trough is equipped, at each end thereof, with a set of stop devices 56, designated 56a through 56f. Each device 56 includes a square tubular member 58 extending through the associated trough plate and affixed thereto, as by welding. The lower end of the member 58 is closed by a plate 60 carrying a plate disc 62 centered in the member 58. Fitted into the upper end of the member 58 is an elongated stop member 64, which is square in transverse section. The head of the member 64 is recessed on opposite sides thereof, as at 66, and is rounded, as at 68. Fitted into the recesses 66 are Fabreeka pads 70, and fitted over the rounded head is a Fabreeka pad 72. Extending through the lower end of the member 64 is a hole 74 through which there extends a bolt 76. The opposite end portions of the bolt 76 extend respectively through elongated holes 78 in opposite sides of the member 58. Interposed between plate 60 and stop member 64 is a compression spring 80 biasing the stop member 64 upwardly to a normal position wherein the head thereof protrudes above the associated trough plate.

Two steel coils, designated C, are deposited in each trough respectively adjacent to opposite sides of the car. The stop members 64 of the devices 56a, 56b, 56d and 56e are thereby depressed. The devices 56c and 56f are spaced inwardly from the inner ends of the coils C and therefore their stop members 64 are not depressed. Devices 56a through 56f coact to secure the coils C against excessive movement longitudinally of the trough. The devices 56a, 56b, 56d and 56e frictionally grip the bottoms of the coils C and resist movement thereof longitudinally of the trough toward the devices 56c and 56f. Should a coil C move sufficiently to engage the stop members 64 of the associated devices 56c and 56f, the coil is restrained thereby against any further movement.

It will be understood that the stop member 64 may be depressed against the influence of the spring 80 till the top thereof is flush with the surface of the associated trough plate. In addition, it should be noted that the devices 56 are positioned proximate the bottom of the trough for engagement with both large and small diameter coils. The Fabreeka pads are provided to protect the steel coils against injury during shipment. In addition to eliminating the necessity for elaborate blocking of the load, the devices 56 eliminate the necessity for workmen being in the car while the coils are being loaded and unloaded.

It will be understood, of course, that the invention has been described in connection with a railroad freight car having a floor of the trough type merely for the purpose of illustration. Railroad freight cars having other types of floors may be equipped with the stop devices 56—for example, flat, gondola and box cars for palletized or other type loading now requiring expensive blocking by the shipper. In addition, other types of vehicles, such as motor trucks, may be equipped with the stop devices 56, not only for shippnig coils of steel, but for shipping other freight.

What is claimed is:

1. In a vehicle for transporting freight, the combination comprising a floor structure having a series of troughs extending transversely of the vehicle for cradling freight in the form of cylindrical objects and the like, a first plurality of yieldably biased devices extending above the floor and positioned inwardly from the side of the vehicle for engaging the ends of said freight objects, and a second plurality of yieldably biased devices mounted in the opposing sides of said troughs for engaging the undersides of said freight objects and for being depressed thereby against the influence of the bias, whereby to coact with the first plurality of devices in controlling shifting of the freight transversely of the vehicle.

2. In a railroad freight car for shipping coils of metal, the combination comprising a floor structure providing a plurality of troughs extending transversely of the car, each of said troughs being of a length for cradling two of the coils deposited respectively at opposite ends of the trough adjacent the sides of the car, a pair of devices associated with each coil and mounted respectively in the opposite sides of the trough for engaging the inner end of the coil when it moves longitudinally of the trough away from the side of the car, and two additional pairs of said devices associated with each coil and mounted respectively in the opposite sides of the trough for engaging the underside of the coil and coacting with the first mentioned pair of devices for securing the coil from movement longitudinally of the trough, each device of the several pairs thereof including a tubular member extending into and affixed to the side of a trough, an elongated stop member fitted into said tubular member for movement axially thereof, means on said tubular and stop members coacting to limit movement of said stop member from a normal extended position wherein the head of said stop member protrudes from the side of the trough and a position wherein said stop member is retracted at least far enough to place the top of said head flush with the surface of said trough side, and a compression spring in said tubular member yieldably biasing said stop member toward said normal extended position.

References Cited
UNITED STATES PATENTS

| | | | |
|---|---|---|---|
| 2,581,137 | 1/1952 | Pelouch | 187—8.74 |
| 2,734,597 | 2/1956 | Pelouch | 187—8.74 |
| 2,757,039 | 7/1956 | Merriman | 296—43 |
| 2,931,316 | 4/1960 | Blackwell | 104—172 |
| 3,197,236 | 7/1965 | Burton | 280—179 |
| 3,291,073 | 12/1966 | James | 105—367 |

DRAYTON E. HOFFMAN, *Primary Examiner.*